United States Patent [19]

Schoenfeld

[11] 4,446,732
[45] May 8, 1984

[54] CRANKSHAFT BALANCE CENTERING

[75] Inventor: Harald Schoenfeld, Darmstadt-Arheilgen, Fed. Rep. of Germany

[73] Assignee: Carl Schenck AG, Fed. Rep. of Germany

[21] Appl. No.: 384,191

[22] Filed: Jun. 3, 1982

[30] Foreign Application Priority Data

Jun. 6, 1981 [EP] European Pat. Off. ........ 81104386.8

[51] Int. Cl.³ .............................................. G01M 1/16
[52] U.S. Cl. .................................................... 73/461
[58] Field of Search ................ 73/461, 462, 465, 655, 73/66

[56] References Cited

U.S. PATENT DOCUMENTS 2,746,299  5/1956  Federn et al. ......................... 73/461
3,952,602  4/1976  Lyman et al. ......................... 73/465

FOREIGN PATENT DOCUMENTS 841570  7/1960  United Kingdom ................. 73/461

Primary Examiner—James J. Gill
Attorney, Agent, or Firm—Connolly and Hutz

[57] ABSTRACT

A switch is provided for ending the shifting movement of a crankshaft when the balance thereof is being adjusted in a machine for balance centering. The machine for balance centering is provided with a bearing bed below a swing bridge supported by means of springs, in which machine the crankshaft to be balance centered rotates around the axis of the machine. The axis of the crankshaft can be displaced in relation to the axis of the machine until a minimal rotation radius has been obtained for a point on the surface of two selected crankshaft sections rotating around the axis of the machine without eccentricities due to the system.

3 Claims, 2 Drawing Figures

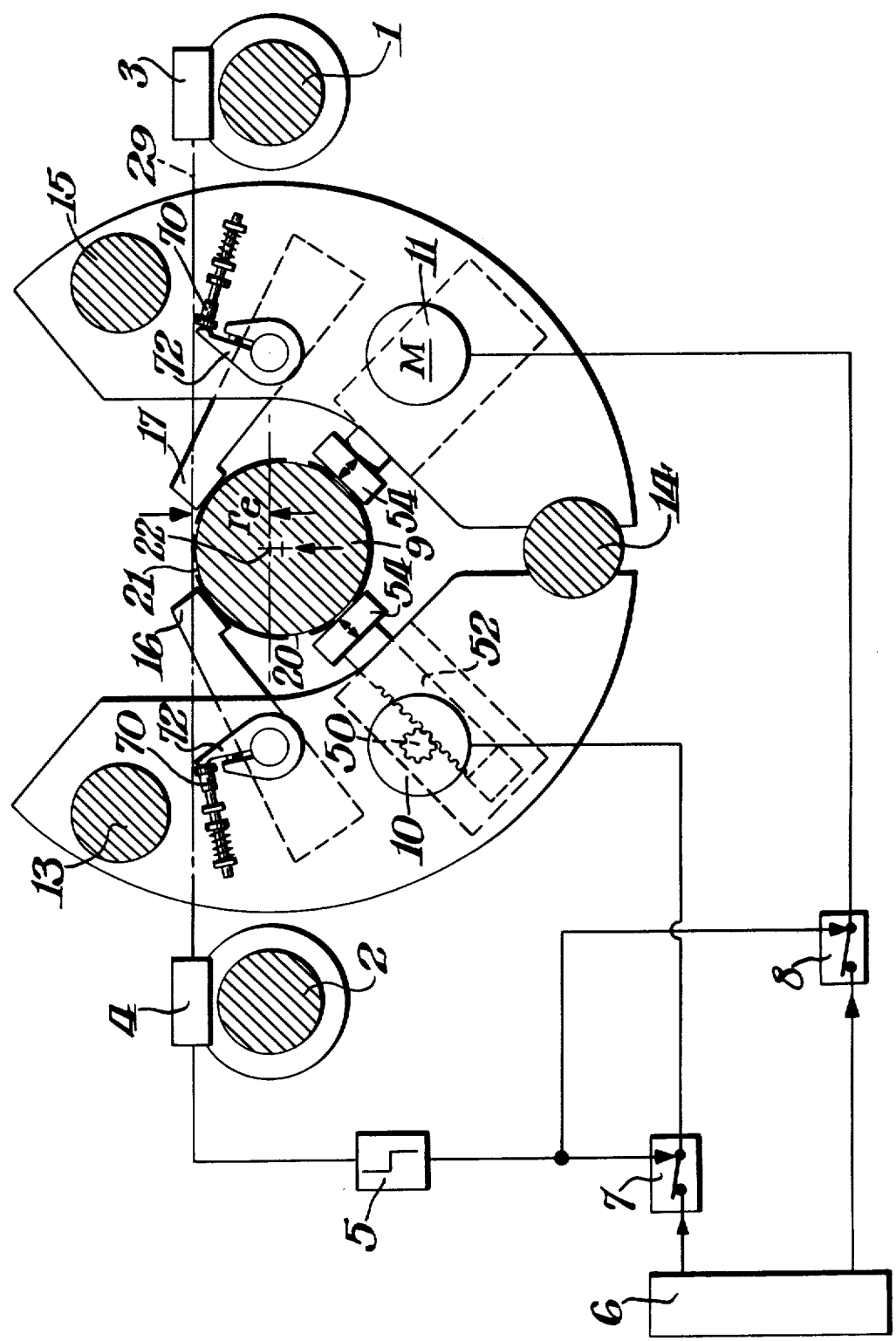

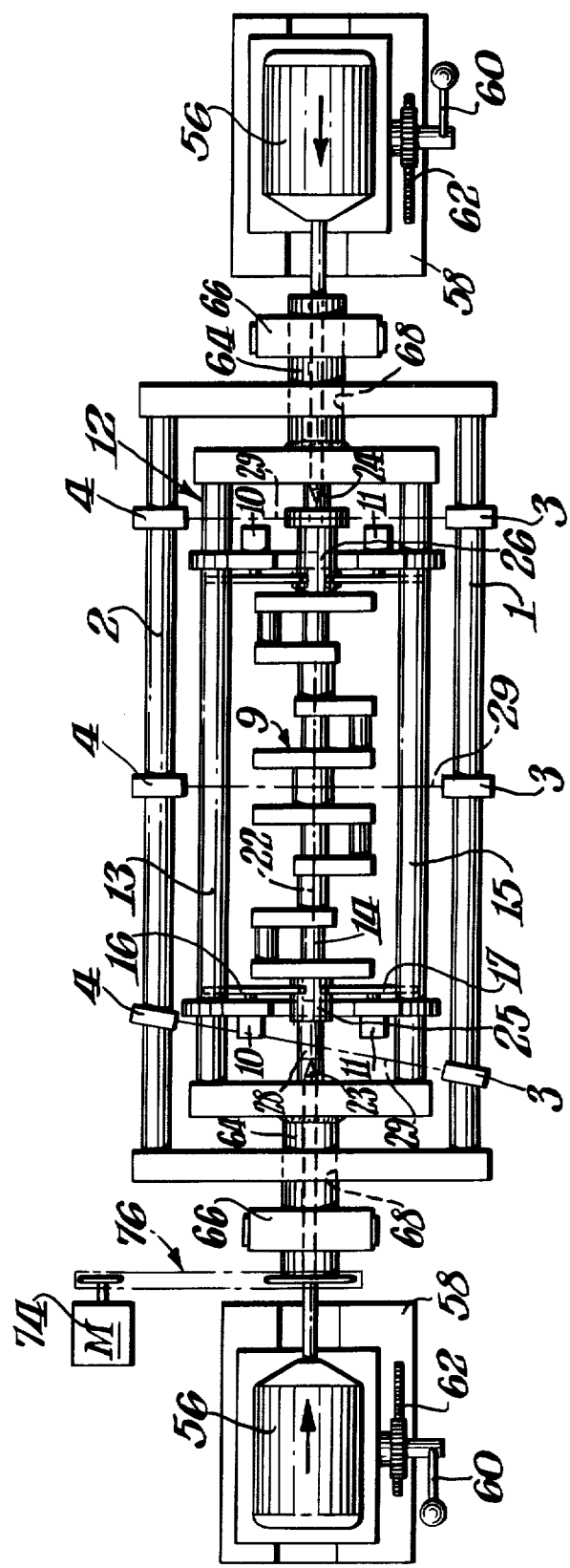

CRANKSHAFT BALANCE CENTERING

BACKGROUND OF THE INVENTION

The present invention relates to a switch for stopping the shifting movement of a crankshaft immediately after the proper balance centering thereof has been determined.

A device of the general nature mentioned above is discussed in German Patent No. 28 23 219 (U.S. Pat. No. 4,300,197 the disclosure of which is incorporated herein by reference), which concerns a procedure and a device for centering of rotational bodies with non-uniform mass distribution along the shaft axis. The surface of those rotationally symmetrical parts which contain the shaft axis are radially sensed by means of mechanical sensors. The purpose of this sensing is to guarantee a displacement of a crankshaft until a minimal rotation radius has been obtained for one point on the surface of two selected crankshaft sections rotating around the axis of the balancing machine without eccentricities due to the system. Should such a sensing not take place, there would be a danger that, given the extreme unbalance of a raw crankshaft, it would be possible to balance the crankshaft with corresponding guidance, but that rejections would occur in later mechanical processing of the main bearing necks or crank pins due to an occurring great geometrical eccentricity in the geometrical axis of the crankshaft. Since the minimum permissible rotation radius $r_e$ of a point on the surface of the crankshaft section to be machined may not be obtained, e.g. due to a slanting of the geometrical crankshaft axis, rejections are likely in later mechanical processing.

The manufacturing of a crankshaft involves molding or forging the preliminary component. A component of this type is called raw crankshaft. As a result of the molding or forging, this raw crankshaft has a non-uniform mass distribution along the axis of the shaft. This raw crankshaft can now be placed on a milling machine, the required positions can be turned and ground on the milling machine, and the completed crankshaft can then be brought to a balancing machine where the unbalance of this crankshaft can be determined. It will then be found that a great proportion of the finished crankshafts have such an unbalance that it is no longer possible to compensate for this, since that space in the motor where the shaft can rotate is limited. From this, it is apparent that such a procedure is definitely not economical.

U.S. Pat. No. 2,746,299 (incorporated herein by reference) and above noted U.S. Pat. No. 4,300,197 describe how this obvious disadvantage can be eliminated. This is achieved by placing the raw crankshaft in a dynamic centering machine before it is mechanically processed. This centering machine accommodates the raw crankshaft in two bearings, each of which can be moved in one plane by means of motors. When the crankshaft is positioned and the centering machine begins to turn, the unbalance vibrations are recorded in the movable bearings via vibration recorders connected to the centering machine. In response to the information from the vibration converters, the motors that reset the positions are activated, and the specific end of the raw crankshaft is displaced until the vibration converter no longer measures an unbalance. Accordingly, the raw crankshaft has been brought into such a position after being moved at both ends by means of the movable bearings such that the resulting rotation axis stands at an oblique angle to the original rotational axis of the raw crankshaft. This obliquely angled axis is used as a geometrical axis for later processing and is then counterbored by means of drills so that the indicated geometrical axis serves as zero axis for later measurement of the balance of another machine (e.g. balancing machine). This axis is also the rotational axis of the finished shaft.

Other devices and procedures for balancing elongated bodies such as crankshafts, which have been mentioned in the above cited disclosure documents, do not include any device for measurement and control of the minimum rotational radius.

SUMMARY OF THE INVENTION

On the basis of this state of the art, the purpose of the present invention is to unequivocally avoid those great geometrical eccentricities which occur in the balancing and which cause rejections in the final machining of a crankshaft around the balanced shaft axis. According to the invention, this problem is solved thereby that two emitters for sharply bundled light are provided on the swing bridge, which emit light rays to receivers located opposite them on the swing bridge. The light beams cross each other at the distance of the minimum radius of the axis of the balancing machine. The adjustment is interrupted when one of the receivers first picks up light over a section of the crankshaft. Thus, the switch according to the invention makes it possible to utilize the momentary position of the crankshaft to be centered as an impulse for deactivation, even when the controlled distance of the crankshaft is in the shadow of additional equipment during the rotation. Thereby, a rejection caused by gross geometrical eccentricity is avoided in the subsequent mechanical processing of the crankshaft. Since the emitters and receivers of sharply bundled light are located on the swing bridge, there is no possibility that the switching rays of light would be influenced by superposed movements.

One execution of the invention consists in the provision for at least one additional arrangement of emitter and receiver for sharply bundled light with the purpose of including the curvature of the crankshaft. This inventive execution makes it possible to balance even "curved" crankshafts, since the control of the already curved crankshaft includes the curvature when great geometrical eccentricities are adjusted, namely by means of this additional light switch, and since in this arrangement as well, the adjustment process is immediately interrupted when a light beam reaches the corresponding receiver due to curvature in the crankshaft even though the material mass is still sufficient at other locations on the crankshaft.

In an additional execution of the object of the invention, it is suggested that the light rays cross the axis of the balancing machine at an oblique angle. Such an execution makes it possible to achieve flexibility in the installation, while at the same time, potential causes of shadows would be eliminated.

BRIEF DESCRIPTION OF THE DRAWING

Novel features and advantages of the present invention in addition to those mentioned above will become apparent to those skilled in the art from a reading of the following detailed description in conjunction with the accompanying drawing wherein:

FIG. 1 is a cross sectional view of a swing bridge and crankshaft cage of a balancing machine, according to the present invention; and FIG. 2 is a top plan view of the swing bridge and crankshaft cage of the machine.

DETAILED DESCRIPTION OF THE INVENTION

Referring in more particularity to the drawings, several emitters 3 are arranged on a swing frame 1,2, and across from each there is a receiver 4. The sharply bundled light from the emitter may be a laser beam which is captured in a photo element developed as a receiver. When the receiver senses a light impulse via a threshold value switch 5, the unbalance measurement device 6 of the balance centering machine is influenced in such a way that the stepping motors 10 and 11 will be immediately turned off and the crankshaft 9 arrested in this position. Each of the stepping motors 10,11 is connected to rotate a pinion gear 50 in meshing engagement with a rack 52 supportingly engaging the shaft 9 to be balanced. Each rack includes a support pad 54 that engages the shaft 9.

After the shaft is so center balanced, the shaft ends are centered by means of the drill bits 23 and 24, which act in the direction of the axis of the balancing machine, as shown best in FIG. 2. Each of the drill bits 23,24 is connected to a motor 56 slidably mounted on a drill motor bed 58. A lever arm 60 together with a rack and pinion 62 function to shift the bits during the drilling operation, as is well known.

The stepping motors 10 and 11 function to dislocate the crankshaft 9 by means of switches 7 and 8 until the crankshaft is balanced or the receiver senses a light impulse above the threshold set by switch 5. In the illustrated example, the crankshaft 9 is inserted in a cage 12, as shown in FIG. 2. The cage has hollow stub shafts 64 at each end thereof, and each shaft is journaled in a leaf spring support bearing 66. The stub shafts 64 extend through openings 68 in the swing frame 1,2, as best shown in FIG. 2. The cage 12 is also provided with longitudinal braces 13, 14, and 15, which extend over the entire length of the crankshaft 9, which is to be examined. The motors 10 and 11 as well as the braces 16 and 17 are arranged on this cage. One pair of motors 10 and 11 and one pair of braces 16,17 are provided for each one of the planes 25,26 which are to be dislocated so that the crankshaft may be moved over its entire length in relation to the measured static and dynamic balances. Spring biased pins 70 bear against levers 72 attached to the pivotally mounted braces 16,17, as shown best in FIG. 1. The crankshaft and the cage are rotated relative to the swing bridge until the unbalance has been eliminated. This is accomplished by a motor 74 operably connected to one of the stub shafts 64 by a sprocket and chain drive 76.

The light beam 29 from the emitter 3 is arranged so that it crosses the axis of the balancing and centering machine at the minimum distance $r_e$. The crankshaft 20 to be balanced and centered is simply positioned in the machine so that it rests upon the pads 54 located near the ends of the machine. The spring biased braces 16 and 17 hold the crankshaft against the pads as is clear from the drawings. The sensors comprising the emitters 3 and receivers 4 serve as off-switches if the unbalance is such that it causes too great a displacement at the ends of the raw shaft. Without such off-switches it might not be possible to locate the centering borings in the raw crankshaft, or if it were still possible to apply a centering boring in the shaft end in question, the degree of obliqueness might cause a bearing location to become so small in the machine milling that it does not meet the diameter requirements for the bearing to be mounted at this position. The overall concern is to deactivate the balance centering machine at the right time, to avoid the occurrence of rejections in the subsequent mechanical processing.

In operation, after crankshaft 9 is inserted into cage 2, unbalance values for two selected planes 25,26 of the crankshaft are measured at the unbalance measurement device 6. According to this unbalance information, motors 10,11 are adjusted to displace the shaft until the unbalance measurement is zero. Next, the motors are deenergized and the plane 25 of the crankshaft is thereby fixed at a position having no unbalance. The other plane 26 of the crankshaft is similarly adjusted to zero balance. Throughout the entire operation, should light beam 29 from emitter 3 strike receiver 4, motors 10,11 are immediately deenergized since further displacement of the crankshaft would be excessive and thereby produce a product useless for its intended purpose. In other words, further dislocation of the crankshaft would result in too oblique a crankshaft center line. Subsequent mechanical processing would produce end bearings on the crankshaft much too small. The minimum distance $r_e$ illustrated in FIG. 1 is the minimum distance between the exterior of the crankshaft and the centered shaft ends formed by drill bits 23,24. Anything less than distance $r_e$ will not leave sufficient material for the fabrication of the bearing ends of the crankshaft. Hence, the balancing operation continues until the crankshaft is either balanced or the receiver 4 senses a light impulse from emitter 3. When this latter condition occurs, motors 10,11 are deenergized to prevent further displacement of the shaft which would otherwise render it useless for its intended purpose.

It has been found that the shadow on the crankshaft from the longitudinal braces 13, 14 and 15—in the present example, two shadows have been indicated at 20 and 21—has no more than a negligible influence on the balancing function according to the invention.

As shown if FIG. 2, the end pin 28 of the crankshaft 9 is controlled by an oblique emitter-receiver system. In each case, the adjustment of the receiver system 3,4 occurs so that these are arranged on the swing bridge in such a manner that the sharply bundled light beam 29 crosses the axis 22 of the balancing machine at the minimum distance $r_e$.

What is claimed:

1. An arrangement for interrupting the dislocation of a crankshaft during centering thereof in a balance centering machine, whereby the machine is provided with a bearing bed below a swing bridge in which bearing bed the crankshaft to be balance centered is arranged to rotate around the axis of the machine and whereby the axis of the crankshaft may be displaced in relation to the axis of the machine until a minimal rotation radius has been obtained for a point on the surface of two selected crankshaft sections rotating around the axis of the machine without eccentricities due to the system, characterized in that two light emitters each for producing a sharp beam of light are arranged on the swing bridge, two light receivers in opposite positions to the emitters arranged on the swing bridge, the light beams crossing the axis of the balancing machine at a predetermined minimum radius distance, and means for moving the crankshaft to be balanced relative to the axis of the machine at several locations along the crankshaft axis until a receiver captures the first light over a section of the crankshaft and immediately thereafter interrupting such movement at that location.

2. An arrangement according to claim 1, characterized thereby that at least one additional emitter and receiver are provided.

3. An arrangement according to any one of claims 1 or 2, characterized thereby that at least one light beam crosses the axis of the balancing machine at an oblique angle.

* * * * *